United States Patent Office 3,500,652
Patented Mar. 17, 1970

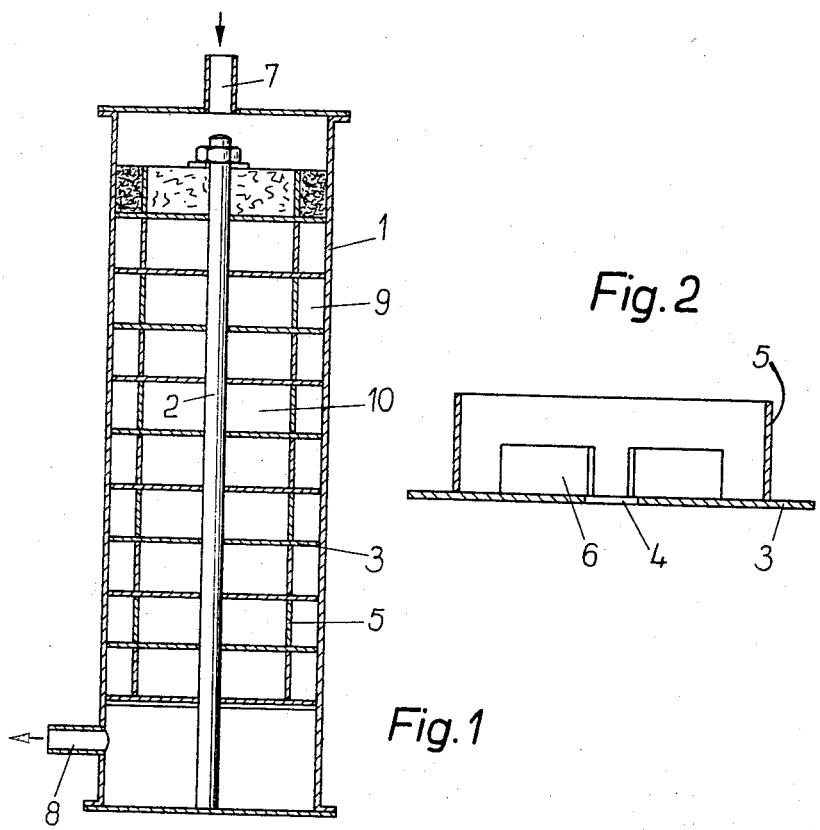

3,500,652
LIQUEFIED GAS FILTER
Horst Manns, Lubeck-Siems, Paul Zorner, Eggerscheidt, Ratingen, and Willi Breitenstraeter, Lubeck-Kuchnitz, Germany, assignors to Messer Griesheim GmbH, Frankfurt am Main, Germany, a corporation of Germany
Filed Jan. 30, 1967, Ser. No. 612,516
Claims priority, application Germany, Feb. 4, 1966, M 68,369
Int. Cl. F25j 3/08; B01d 27/02, 25/06
U.S. Cl. 62—18                    3 Claims

ABSTRACT OF THE DISCLOSURE

A filter for removing aromatic substances from liquefied gas, such as oxygen, is made of a fibrous batting material which may be disposed in a housing divided by spaced sieve bottoms.

BACKGROUND OF THE INVENTION

It is a known phenomenon that liquid oxygen which has been rectified or purified from air by previously being conducted through oil lubricated compressors, contains aromatic substances of a composition which has not yet been fully determined. These aromatic substances are washed or floated out of the production plant by storage and transport containers and usually accumulate at those places where the liquid oxygen evaporates. This phenomenon presents no serious problems if such oxygen is employed for industrial or technical purposes. If however it is employed, for example, in hospitals for breathing purposes, then these aromatic substances do present a serious problem.

This bad odor is partly caused by low (boiling) hydrocarbon compounds which can be removed with the aid of silica gel or of molecular sieves. However, the very compounds that cause the most undesired odors are not retained in such filters. On the other hand, they are also not contained in the liquid oxygen in a sufficiently large particle size that they can be retained by microporous mechanical filters.

SUMMARY OF THE INVENTION

An object of the invention is to provide a filter for removing the aromatic substances which would otherwise still pass through mechanical filters and molecular sieves. Such substances comprise the majority of the most undesirable aromatic substances. It is essential for the successful operation of this invention that the entire liquid actually comes into contact uniformly with the filter substance. Even very minor amounts of liquid, which for example pass through the filter at the walls of the container without sufficiently contacting the filter material, will lessen the intended results of this invention.

In accordance with the invention, the filter material is a finely fibrous wadding-like material, for example slag (mineral) wool or glass wool. When this filter material is in a finely packed condition only small free space sectional areas for the passage of the liquid therethrough are kept free, and a large surface is formed, on which the aromatic substances remain in the filter material. As has been surprisingly demonstrated, the liquid gas which leaves the filter, however, is completely free of odor.

In order to attain a rapid and complete removal of the aromatic substances, the filter material is subdivided by providing a number of sieve bottoms arranged one above the other. Further details concerning the construction of the filter are contained in the following description of the invention.

BRIEF DESCRIPTION OF THE DRAWINGS

FIGURE 1 is a filter formed in accordance with the invention.

FIGURE 2 is a cross-sectional view of one filter member.

FIGURE 3 is a top view of the member shown in FIGURE 2.

DETAILED DESCRIPTION

The filter consists of a tube 1 which is closed except for an inlet opening 7 and an outlet opening 8. Mounted within tube 1 is an axial shaft upon which are attached the sieve bottoms or base members 3 separated from each other and tightly lying against the shaft 2. The diameter of the tube depends upon the amount of liquids to be filtered in a unit of time and may be constructed in any desired manner. Rings or partitions 5 are attached to the sieve bottoms or separators 3 spaced from the wall of the tube 1. These rings 5 subdivide the sieve bottoms into an outer ring chamber 9 and an inner chamber 10. In the outer annular chamber 9 the filter material is packed as firmly as possible until it tightly or densely fills the whole chamber. In the inner ring chamber 10 the filter material is merely loosely packed. In order to prevent slipping (of the filter material), ribs 6 are provided. This construction of the filter inserts has the advantage that the outer diameter of the sieve bottoms need not precisely correspond with the inner diameter of the tube, but rather may be smaller. It is thereby possible to provide for an easier replacement of the sieve bottoms and the filter materials and, in toto, a cheaper production of the filter. The sieve bottoms 3 are provided with a plurality of small bores which are not illustrated in detail in the drawing. As is apparent from FIGURE 2, the ribs 6 are about half as high as the rings 5. The addition or removal of the liquefied gases may take place both vertically as well as radially and tangentially.

What is claimed is:

1. A filter for removing aromatic substances from a gas while the gas is in a liquid state comprising a housing, an inlet at the top of said housing, means for feeding aroma containing liquefied gas to said inlet, an outlet in said housing at the bottom thereof downstream from said inlet, fibrous adsorbing material selected from the group consisting of glass wool and slag wool being in said housing between said inlet and said outlet, said housing being divided into a plurality of chambers by spaced separators, said adsorbing material being tightly packed against the inner wall of said housing to prevent unfiltered liquefied gas from passing between said inner wall and said separators, said housing being imperforate except for said inlet and said outlet, an axial shaft being mounted in said housing, said separators being mounted upon said shaft with each separator being tightly disposed against said shaft, an annular partition being provided on each separator to divide the space between adjacent separators into a pair of concentric annular chambers, each partition on each separator abutting against an adjacent separator, the inner annular chamber of each pair of said annular chambers being loosely packed with said adsorbing material, and the outer annular chamber being tightly packed.

2. A filter as set forth in claim 1 wherein upstanding ribs are provided on said separators within the inner of the various pairs of annular chambers to prevent slippage of said filter material therein.

3. A process for removing aromatic causing substances from oxygen gas while the gas is in a liquid state comprising feeding the unfiltered aroma containing liquefied gas into a housing, passing the liquefied gas through sets of annular chambers filled with relatively thick layers of fibrous adsorbing material selected from the group consisting of glass wool and slag wool with the adsorbing material presenting a relatively large surface for being contacted by the liquefied gas, causing the entire liquefied gas to uniformly come into contact with the adsorbing material with the adsorbing material being disposed in each chamber in an inner arrangement of loosely packed adsorbing material and an outer arrangement of tightly packed adsorbing material, collecting the aromatic substances on the surface of the adsorbing material, and discharging the liquefied gas from the housing.

References Cited

UNITED STATES PATENTS

| | | | |
|---|---|---|---|
| 779,859 | 1/1905 | Lukens | 210—335 |
| 893,360 | 7/1908 | Paul | 210—344 |
| 1,981,307 | 11/1934 | Burhans | 210—484 |
| 2,378,879 | 6/1945 | Zylstra | 210—484 |
| 2,593,227 | 4/1952 | Wagner | 210—335 X |
| 2,593,228 | 4/1952 | Wagner | 210—335 X |
| 2,609,932 | 9/1952 | Fricke | 210—484 |
| 3,316,725 | 5/1967 | Dennis | 62—14 |
| 809,218 | 1/1906 | Pictet | 62—14 X |
| 1,891,125 | 12/1932 | Van Gessel | 62—18 |
| 2,500,136 | 3/1950 | Ogorzaly | 62—15 |

REUBEN FRIEDMAN, Primary Examiner

JOHN W. ADEE, Assistant Examiner

U.S. Cl. X.R.

210—335, 345